United States Patent
Caldwell et al.

[11] Patent Number: 6,035,425
[45] Date of Patent: Mar. 7, 2000

[54] TESTING A PERIPHERAL BUS FOR DATA TRANSFER INTEGRITY BY DETECTING CORRUPTION OF TRANSFERRED DATA

[75] Inventors: Barry E. Caldwell, Whitewater; Craig C. McCombs, Wichita, both of Kans.

[73] Assignee: LSI Logic Corporation, Milpitas, Calif.

[21] Appl. No.: 08/939,197

[22] Filed: Sep. 29, 1997

[51] Int. Cl.[7] .................................................. G06F 11/00
[52] U.S. Cl. ............................................................ 714/52
[58] Field of Search ........................... 395/185.05; 714/52, 714/704, 706, 800, 821; 710/29, 33, 34, 107, 127; 702/182, 183, 186

[56] References Cited

U.S. PATENT DOCUMENTS

| | | | |
|---|---|---|---|
| 4,236,246 | 11/1980 | Skilling | 371/27 |
| 4,255,748 | 3/1981 | Bartlett | 340/661 |
| 4,438,494 | 3/1984 | Budde et al. | 364/200 |
| 4,546,467 | 10/1985 | Yamamoto | 370/13 |
| 4,972,345 | 11/1990 | Munier et al. | 371/29.5 |
| 5,001,712 | 3/1991 | Splett et al. | 371/3 |
| 5,033,049 | 7/1991 | Keener et al. | 371/23 |
| 5,111,450 | 5/1992 | Cooledge et al. | 370/13 |
| 5,237,660 | 8/1993 | Weber et al. | 395/250 |
| 5,307,491 | 4/1994 | Feriozi et al. | 395/700 |
| 5,412,666 | 5/1995 | Squires et al. | 371/37.4 |
| 5,454,083 | 9/1995 | Choi | 395/285 |
| 5,471,634 | 11/1995 | Giorgio et al. | 395/600 |
| 5,475,814 | 12/1995 | Tomimitsu | 395/183.06 |
| 5,504,689 | 4/1996 | Fiebrich et al. | 364/481 |
| 5,527,996 | 6/1996 | Ham | 174/113 |
| 5,596,716 | 1/1997 | Byers et al. | 395/185.011 |
| 5,613,074 | 3/1997 | Galloway | 395/280 |
| 5,701,409 | 12/1997 | Gates | 395/183.17 |
| 5,742,753 | 4/1998 | Nordsieck et al. | 395/182.09 |
| 5,790,828 | 8/1998 | Jost | 395/404 |
| 5,867,645 | 2/1999 | Olarig | 395/185.01 |

*Primary Examiner*—Robert W. Beausoliel, Jr.
*Assistant Examiner*—Stephen C. Elmore

[57] ABSTRACT

In a computer system having a peripheral bus and a peripheral device coupled together, a method for testing data transfer integrity of the peripheral bus includes the step of transferring first data to the peripheral device via the peripheral bus. Another step of the method includes generating a first error signal if the first data was corrupted during the first data transferring step. The method also includes updating a counter in response to generation of the first error signal. The method further includes generating a second error signal if the counter exceeds a predetermined threshold. Moreover, the method includes the steps of transferring the first data in a first manner, and in response to generation of the second error signal, transferring second data to the peripheral device in a second manner that is different than the first manner. The difference between the first manner and the second manner may include a difference in transfer rate and/or a difference in bus width.

18 Claims, 5 Drawing Sheets

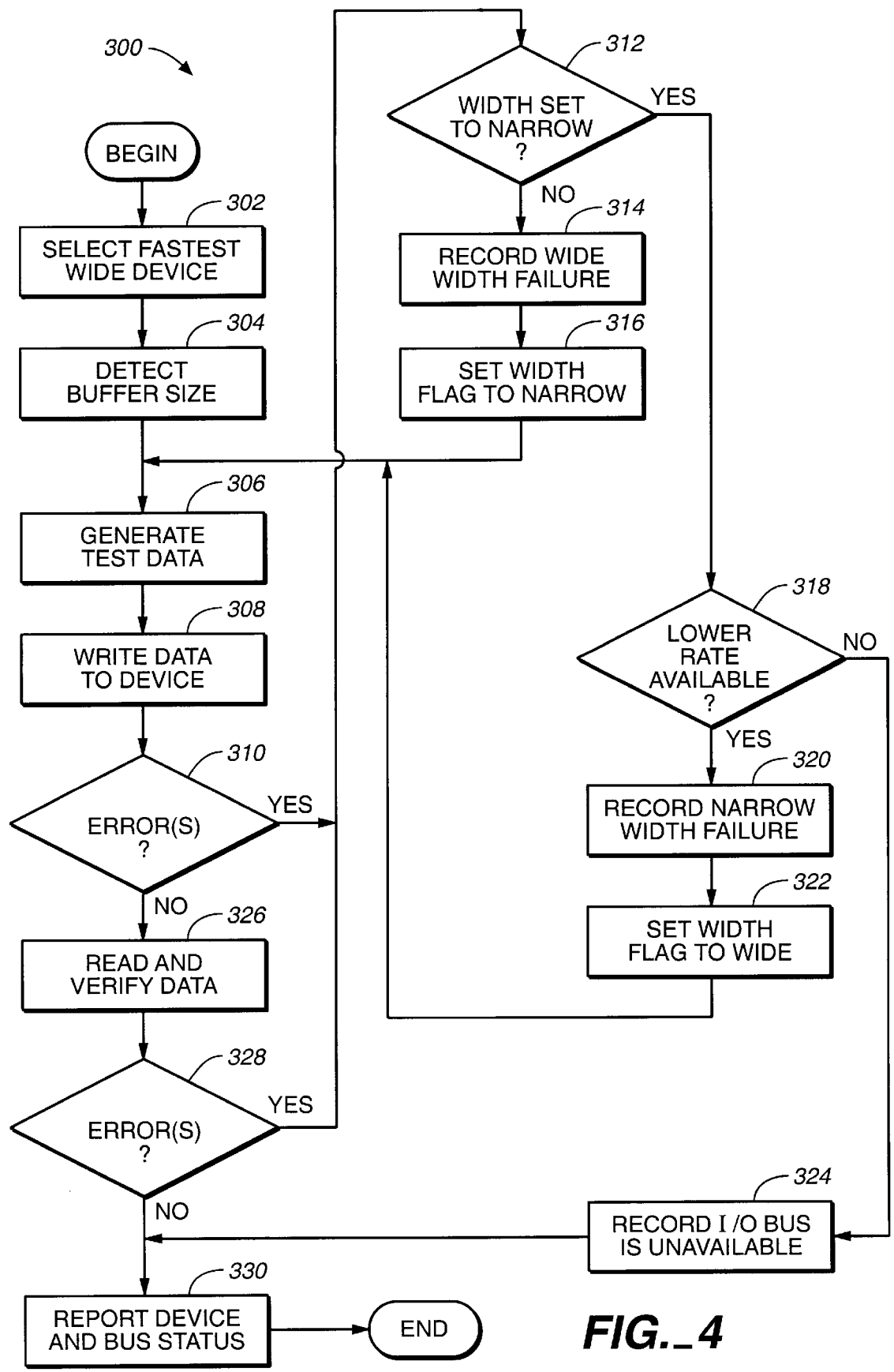
FIG._4

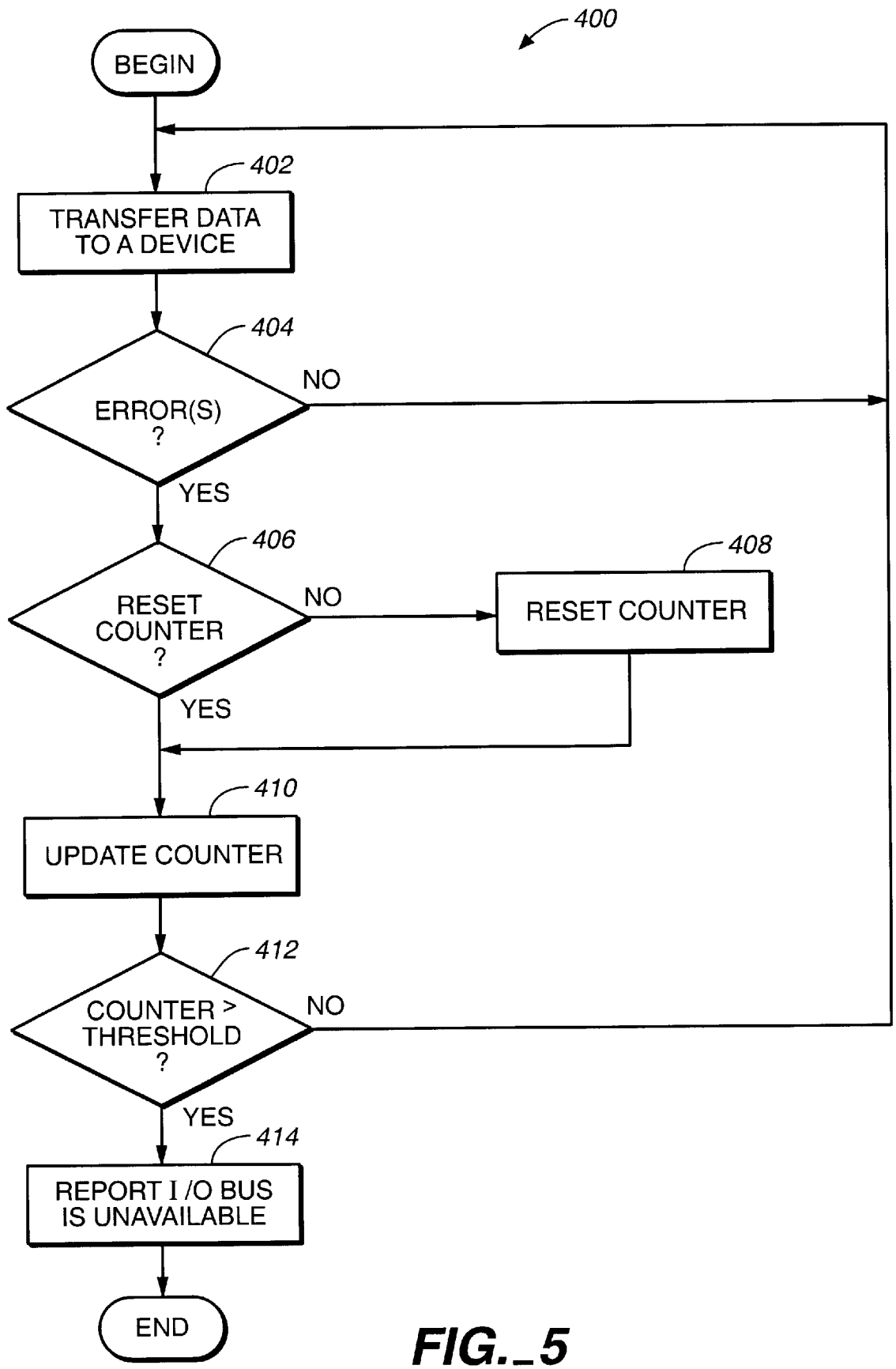
FIG._5

TESTING A PERIPHERAL BUS FOR DATA TRANSFER INTEGRITY BY DETECTING CORRUPTION OF TRANSFERRED DATA

BACKGROUND OF THE INVENTION

The present invention relates generally to bus integrity, and more particularly to a method and apparatus of testing a peripheral bus for data transfer integrity.

Today's standard computer architectures call for a number of peripheral devices such as disk drives, RAID devices, CD-ROM drives, modems, monitors, keyboards, printers, scanners, etc. to be operatively coupled to a computer system by peripheral buses. Peripheral buses are simply groups of conductors (or lines) designed to carry data and control signals to and from peripheral devices.

One such peripheral bus is the small computer systems interface ("SCSI") bus. The SCSI bus is designed to operate in conjunction with a computer system to provide an interface to SCSI standard peripheral devices. There are currently several different SCSI bus standards. Each of these different SCSI bus standards supports various different transfer rates or operating modes such as Asynchronous, Fast, Fast20 (Ultra), and Fast40 (Ultra II). Furthermore, each of these different SCSI bus standards have different cabling specifications, configuration specifications, and signaling modes such as single ended, high voltage differential, and/or low voltage differential signaling modes.

Due to the faster transfer rates, the cabling and configuration specifications for the Fast20 and the Fast40 versions of the SCSI specification requirements are much tighter than those previously required by the slower versions of SCSI. As a result, the Fast20 and Fast40 versions of SCSI have various requirements that are critical to optimal performance and reliable operation to which the slower SCSI bus standards need not adhere. These critical SCSI bus requirements include limits on the impedance of the cable components, the total cable length, the number of devices connected to the bus, maximum stub length, and the minimum distance between devices on the bus. Even a relatively minor violation to the Fast20 and Fast40 SCSI standards can result in degraded performance and unreliable data transfers.

Since users may not appreciate the strictness of these cabling and configuration requirements, a user is quite likely to violate one of these requirements. This likelihood is especially true since SCSI devices that support different SCSI bus standards may be coupled to a single SCSI bus. As a result, a user may add a faster SCSI device to an existing SCSI device chain of slower devices without determining whether the existing SCSI device chain meets the requirements of the faster SCSI bus standard. The existing SCSI chain may be configured for reliable transfers at the slower rate; however, at the faster rate, transfer errors may occur frequently enough that the reliability of data transfers at the faster rate are suspect.

If the user knew that transfer errors were occurring, the user could check or be informed to check the SCSI bus for cabling and configuration compliance. Furthermore, if it could be determined whether transfer errors were occurring at a first transfer rate and not at a second transfer rate, the user or computer system could prevent data transfers from occurring at the second transfer rate. What is needed therefore, is a method and apparatus of testing whether a peripheral bus of a computer system is configured for reliable transfers so that the above remedial measures may be taken.

SUMMARY OF THE INVENTION

In accordance with one embodiment of the present invention, there is provided a first method of testing a peripheral bus for data transfer integrity. In a computer system having a peripheral bus and a peripheral device coupled together, the first method includes the steps of (a) transferring first data to the peripheral device via the peripheral bus, (b) generating a first error signal if the first data was corrupted during the first data transferring step, (c) updating a counter in response to generation of the first error signal, and (d) generating a second error signal if the counter exceeds a predetermined threshold.

Pursuant to another embodiment of the present invention, there is provided a second method of testing a peripheral bus for data transfer integrity. In a computer system having a peripheral bus and a peripheral device coupled together, the second method includes the steps of (a) transferring first data in a first manner to the peripheral device via the peripheral bus, (b) generating a first error signal if the first data was corrupted during the first data transferring step, and (c) in response to generation of the first error signal, transferring second data to the peripheral device in a second manner that is different than the first manner.

Pursuant to yet another embodiment of the present invention, there is provided a computer system. The computer system includes a processor, a memory, a SCSI interface, a system bus, a SCSI device, and a SCSI bus. The system bus operatively couples the processor to the memory and to the SCSI interface, and the SCSI bus operatively couples the SCSI device to the SCSI interface. The memory includes a first set of instructions that when executed by the processor causes first data to be transferred to the SCSI device in a first manner. The SCSI device generates an error signal upon the SCSI bus if the SCSI device determines that the first data, after being received from the SCSI bus, is corrupted. The memory also includes a second set of instructions that when executed by the processor in response to generation of the error signal, causes second data to be transferred to the SCSI device in a second manner.

It is an object of the present invention to improve the integrity of a peripheral bus.

It is another object of the present invention to provide a new method and apparatus for testing the integrity of a peripheral bus.

It is yet another object of the present invention to provide an improved method and apparatus for testing the integrity of a peripheral bus.

It is yet another object of the present invention to provide a method and apparatus that informs a user that the peripheral bus may not be in compliance with the peripheral bus standard.

It is yet another object of the present invention to provide a method and apparatus that improves data integrity by transferring data at a reliable rate of the peripheral bus.

It is yet another object of the present invention to provide a method and apparatus that improves the efficiency of a peripheral bus by decreasing transfer errors.

The above and other objects, features, and advantages of the present invention will become apparent from the following description and the attached drawings.

BRIEF DESCRIPTION OF THE DRAWINGS

FIG. 4 shows a flowchart of a bus width testing method for testing the data transfer integrity of the peripheral bus of FIG. 1; and FIG. 5 shows a flowchart of a threshold method for detecting, during normal operation, data integrity problems upon the peripheral bus of FIG. 1.

DETAILED DESCRIPTION OF THE PREFERRED EMBODIMENT

Figure 1:
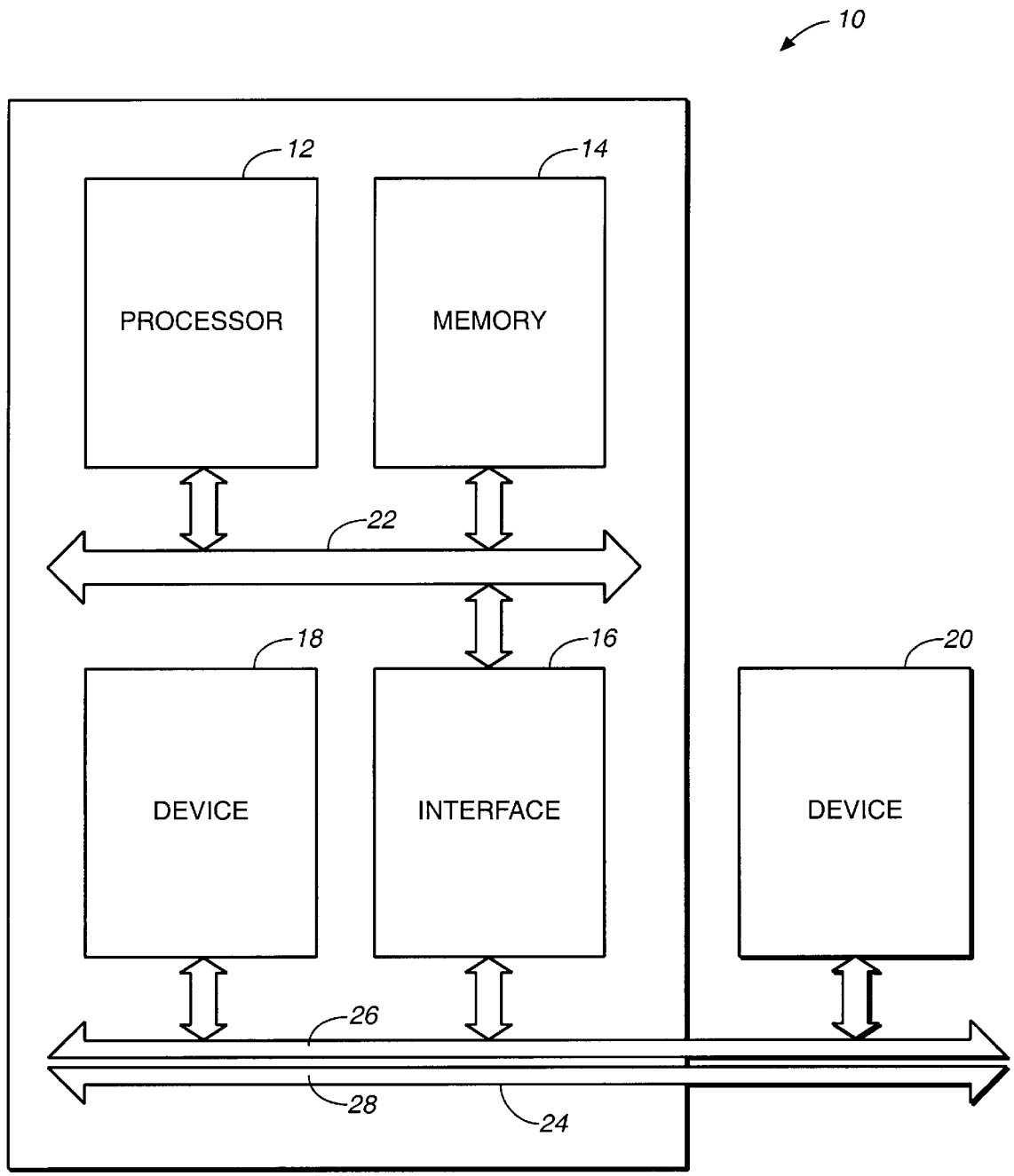
FIG. 1 shows a computer system which is suitable for incorporating various features of the present invention therein.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

A computer system 10 which is suitable for incorporating various features of the present invention therein is shown in FIG. 1. The computer system 10 includes a processor 12, a memory 14, a device interface 16, and peripheral devices 18 and 20. The computer system 10 also includes (a) a system bus 22 that operatively couples the processor 12 to the memory 14 and the device interface 16, and (b) a peripheral bus 24 that operatively couples the peripheral devices 18 and 20 to the device interface 16.

The processor 12 fetches, decodes, and executes instructions, and also controls the transfer of data to and from the device interface 16 and the main memory 14. Furthermore, by executing a device driver that communicates with the device interface 16, the processor 12 accesses data of the peripheral devices 18 and 20. In a preferred embodiment the processor 12 is implemented with a general microprocessor such as the Intel Pentium Pro (P6) processor. The memory 14 stores data and/or instructions which may be fetched, decoded, and executed by the processor 12. In a preferred embodiment, the memory 14 includes 64 Megabytes of dynamic random access memory (DRAM). Furthermore, the peripheral devices 18 and 20 may be any peripheral device such as disk drives, tape drives, RAID devices, CD-ROM drives, printers, monitors, etc.

The peripheral bus 24 is preferably a wide SCSI bus which has a first group of bus lines 26 and a second group of bus lines 28. In this embodiment, 16 bit data and an additional two parity bits are transferred in parallel across the first group of bus lines 26 and the second group of bus lines 28. The lower byte of the 16 bit data is transferred across the first group of bus lines 26, and the upper byte of the 16 bit data is transferred across the second group of bus lines 28. However, many of the advantages of the present invention may be achieved if the peripheral bus 24 is implemented as a universal serial bus (USB), a FireWire bus, or a Fibre Channel bus.

The following methods of FIGS. 2–5 require that the computer system 10 determine whether data that has been transferred across the peripheral bus 24 has been corrupted. It should be appreciated by those skilled in the art that there exists several known methods of making this data corruption determination. Of these known corruption determination methods, the four types that are most common are parity methods, encoding methods, cyclical redundancy check (CRC) methods, and comparing methods.

The comparing methods are the simplest and least efficient of the four methods. The comparing methods simply compare the data sent from a source device to the data received at a destination device, and if the data has changed, then the data at the destination may be corrupted. However, in order to make this comparison, the data is required to be transferred from the source device across the peripheral bus 24 to the destination device and re-transferred from the destination device back across the peripheral bus 24 to the source device. From the above description, it should be appreciated that if the data has changed, the data at the destination device may not be corrupted, but instead the data may have been corrupted during the transfer back to the source device. Furthermore, it should be appreciated that if each source to destination transfer is checked for corruption, the comparing methods double the amount of traffic across the peripheral bus 24.

The other three corruption detection methods, however, eliminate this double transfer by adding additional information to the data which the destination device may use for determining whether the data is corrupted. The simplest of these three methods are the parity methods. The parity methods come in two varieties, even parity and odd parity. Assuming the computer system 10 uses odd parity, a single bit is appended to the data prior to being transferred from a source device across the peripheral bus 24 to a destination device. The value of the appended bit is chosen such that the data including the single bit contains an odd number of logical "1's." The destination device then may calculate a parity value from the data received which indicates whether the data contains an even or an odd number of logical "1's." If this parity value indicates that the data received contains an even number of logical "1's," then the data has changed or was corrupted during the transfer across the peripheral bus 24. It should be appreciated that a parity bit is only effective at detecting single bit errors. As a result, it is common practice to add a separate parity bit to each byte of a large data transfer in order to decrease the odds of undetected data corruption due to multiple bit errors.

The encoding methods generally map a first data word into a second data word containing more bits than the first data word. The second data word is transferred across the peripheral bus 24 to a destination device. The destination device then decodes or re-maps the second data back to the first data word. Furthermore, due to the manner in which the first data word is encoded, the destination device in decoding the second data word may detect data corruption resulting from the transfer across the peripheral bus 24. It should be appreciated that the second data may contain redundant information since the second data includes more bits than the first data. As a result, it is well known in the art that a first data word can be mapped into a second data word having three more bits than the first data word in such a manner that not only can the destination device detect up to a two bit error in the second data, the destination device can correct a one bit error in the second data.

The CRC methods generally use a complex calculation to generate a number or checksum that is based upon the data to be transferred across the peripheral bus to a destination device. Prior to transferring data across the peripheral bus 24, the complex calculation is performed to generate a first checksum from the data to be sent. The data and first checksum are then transferred across the peripheral bus 24 to a destination device. The destination device then performs the same complex calculation upon the data received via the peripheral bus 24 to obtain a second checksum value. The destination device then compares the second checksum value to the first checksum value. If the second checksum value is not equal to the first checksum value, then either the data or the first checksum was corrupted during the transfer across the peripheral bus 24.

In order to simplify the description of methods 100, 200, 300, and 400 of FIGS. 2–5, each of these methods 100, 200, 300, and 400 assumes that the computer system 10 is utilizing at least one corruption detection method.

Figure 2:
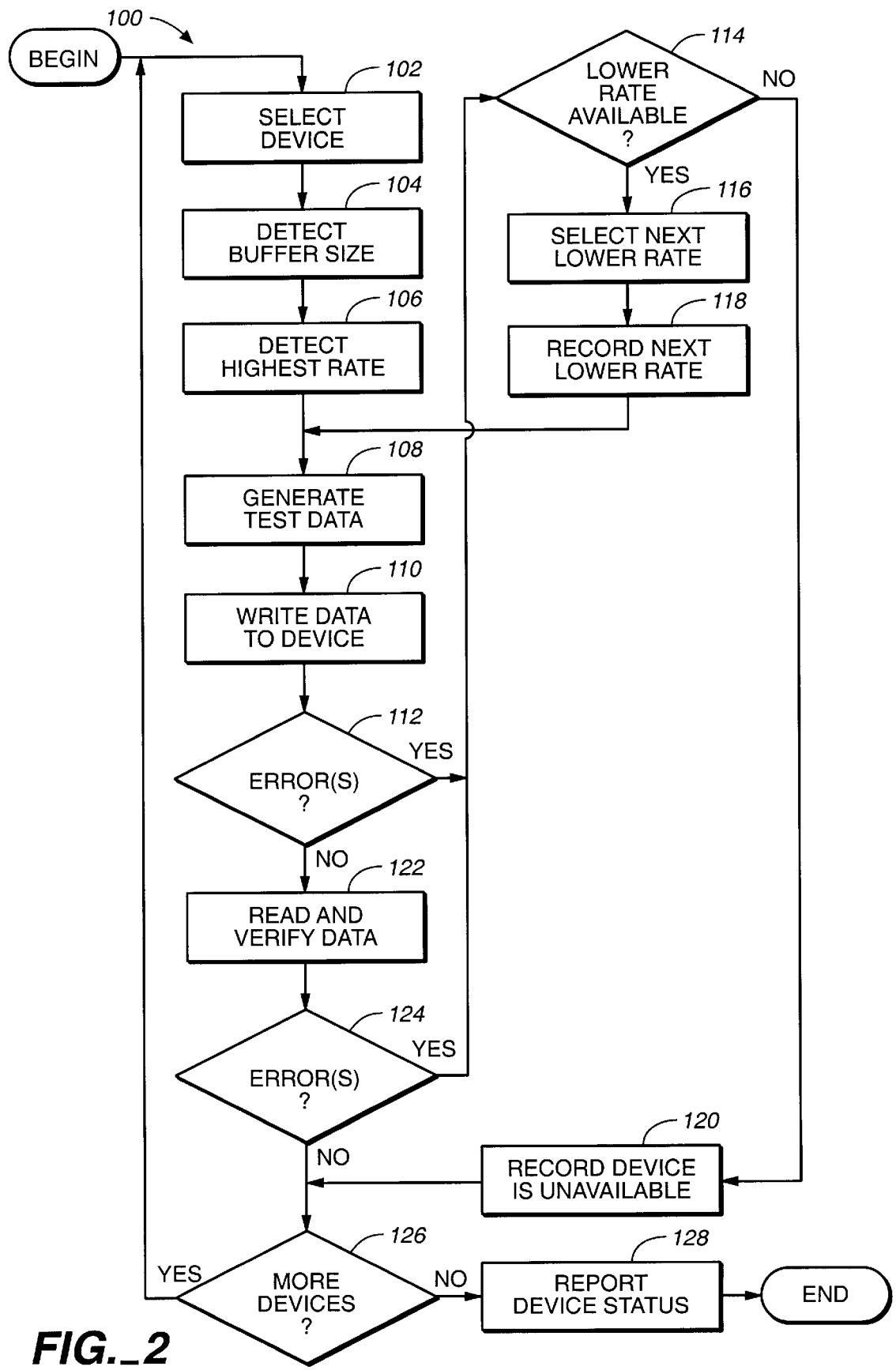
FIG. 2 shows a flowchart of an exhaustive test method for testing the data transfer integrity of the peripheral bus of FIG. 1.

Referring now to FIG. 2, there is shown a flowchart of an exhaustive test method 100 for testing the data transfer integrity of the peripheral bus 24. The purpose of the exhaustive test method is to systematically and exhaustively determine for each peripheral device 18 and 20 that is coupled to the peripheral bus 24 the highest reliable transfer rate supported and to configure the computer system 10 to subsequently transfer data to peripheral devices 18 and 20 at the highest reliable transfer rate supported by the respective peripheral devices 18 and 20. The exhaustive test method 100 also records and/or reports the availability and transfer rate of each peripheral device 18 and 20 coupled to the peripheral bus 24. This recording and/or reporting provides a system administrator with a valuable tool for later correcting problems when the computer system 10 may be serviced. Furthermore, the exhaustive test method 100 is preferably implemented as a separate diagnostic program which the user can cause the computer system 10 to execute when the user wishes to test the data integrity of the peripheral bus 24.

The exhaustive test method 100 begins in step 102 with the selection of a test peripheral device chosen from the peripheral devices 18 and 20 that are coupled to the peripheral bus 24 of the computer system 10. The selection of a test peripheral device in step 102 may be accomplished in several different manners. For example, the selection may be made based upon the speed of the peripheral devices 18 and 20, the device identifiers of the peripheral device 18 and 20, or a random selection. The peripheral device 18 or 20, that is actually selected for the test peripheral, is not highly important in method 100 because, as will be apparent from the remainder of the description, every peripheral device coupled to the peripheral bus 24 is tested.

In step 104, the computer system 10 determines the amount of buffer memory that the selected test peripheral device contains, and the computer system, in step 106 determines the highest (fastest) transfer rate that the selected peripheral device supports. The computer system 10, then generates in step 108 test data that is either (a) small enough, or (b) structured into multiple transfers that are small enough to be stored within the buffer memory of the test peripheral device. It should be appreciated that by limiting the size or structure of the test data to the buffer memory, the exhaustive method 100 may be executed upon mass storage devices without destroying or altering the data stored on the mass storage medium.

Furthermore, the computer system 10 generates the test data such that it includes patterns which are likely to generate a lot of noise upon the peripheral bus 24 and are therefore likely to be corrupted during transfers. Patterns which are likely to generate noise upon the peripheral bus 24 are patterns which cause many transitions over a short period of time. For example, the following byte patterns (represented in hexadecimal) are likely to generate noise upon peripheral bus 24 if transferred in parallel a byte at a time across the peripheral bus 24: FF, 00, FF, 00, AA, 55, M, 55, AF, 50, AF, 50, FA, 05, FA, 05, etc.

After generating the test data, the computer system 10 in step 110 writes the test data to the buffer memory of the test peripheral device by transferring the test data across the peripheral bus 24 to the test peripheral device at a test rate. Initially, the test rate is selected to be the fastest transfer rate supported by the test peripheral device, and on subsequent iterations, the new test rate is selected to be a lower (slower) transfer rate than the test rate of the previous iteration.

Then, in step 112, the computer system 10 determines whether an error occurred (e.g. data was corrupted) as a result of the writing step 110 transferring the test data across the peripheral bus 24. If the computer system 10 determines in step 112 that an error occurred, then an error signal is generated which causes the computer system 10 to determine in step 114 whether the test peripheral device supports a lower transfer rate than the current test rate. If the peripheral device supports a lower transfer rate, then the next lower transfer rate is chosen (step 116) for the new test rate and the chosen lower rate is recorded (step 118). Furthermore, after selecting the new test rate, the computer system 10 returns to step 108 in order to test the test peripheral device at this newly selected test rate. However, if the peripheral device does not support a lower transfer rate, then an error signal is generated which causes the computer system 10 to disable all transfers to the test peripheral device and to record (step 120) that the test peripheral device is unavailable due to no reliable transfer rate being found for the test peripheral device.

If, in step 112, the computer system 10 determines that an error did not occur in transferring the test data to the test peripheral device, then the computer system 10 in step 122 verifies the determination of step 112. The computer system 10 in step 122 reads the test data from the buffer memory of the test peripheral device and generates an error signal if the data read in step 122 does not match the data written in step 110. In step 124, the computer system 10 determines whether an error signal was generated in step 122. If the error signal was generated in step 122, the computer system 10 proceeds to step 114 where the computer system 10 determines whether the test peripheral device supports a lower transfer rate. However, if the error signal was not generated in step 122, then the tested peripheral bus 24 is likely properly configured for reliable transfers to the tested peripheral device at the tested rate.

In step 126, the computer system 10 determines whether there are peripheral devices coupled to the peripheral bus 24 that have not been tested. If the computer system 10 determines that there is at least one peripheral device that has not been tested, the computer system 10 returns to step 102 so that another peripheral device may be selected for testing. However, if the computer system 10 determines that all peripheral devices coupled to the peripheral bus 24 have been tested, then the computer system 10 generates in step 128 a report indicating which peripheral devices 18 and 20 are unavailable due to no reliable transfer rate being determined and the highest reliable transfer rate supported by each peripheral device 18 and 20 that is available. The reported information may be used by a user to correct problems with the peripheral bus 24 configuration. Furthermore, the computer system 10 may utilize the information to ensure that data transfers to peripheral devices coupled to the peripheral bus 24 occur at reliable transfer rates by limiting future data transfers to the peripheral devices to transfer rates at or below their respectively found reliable rates.

Figure 3:
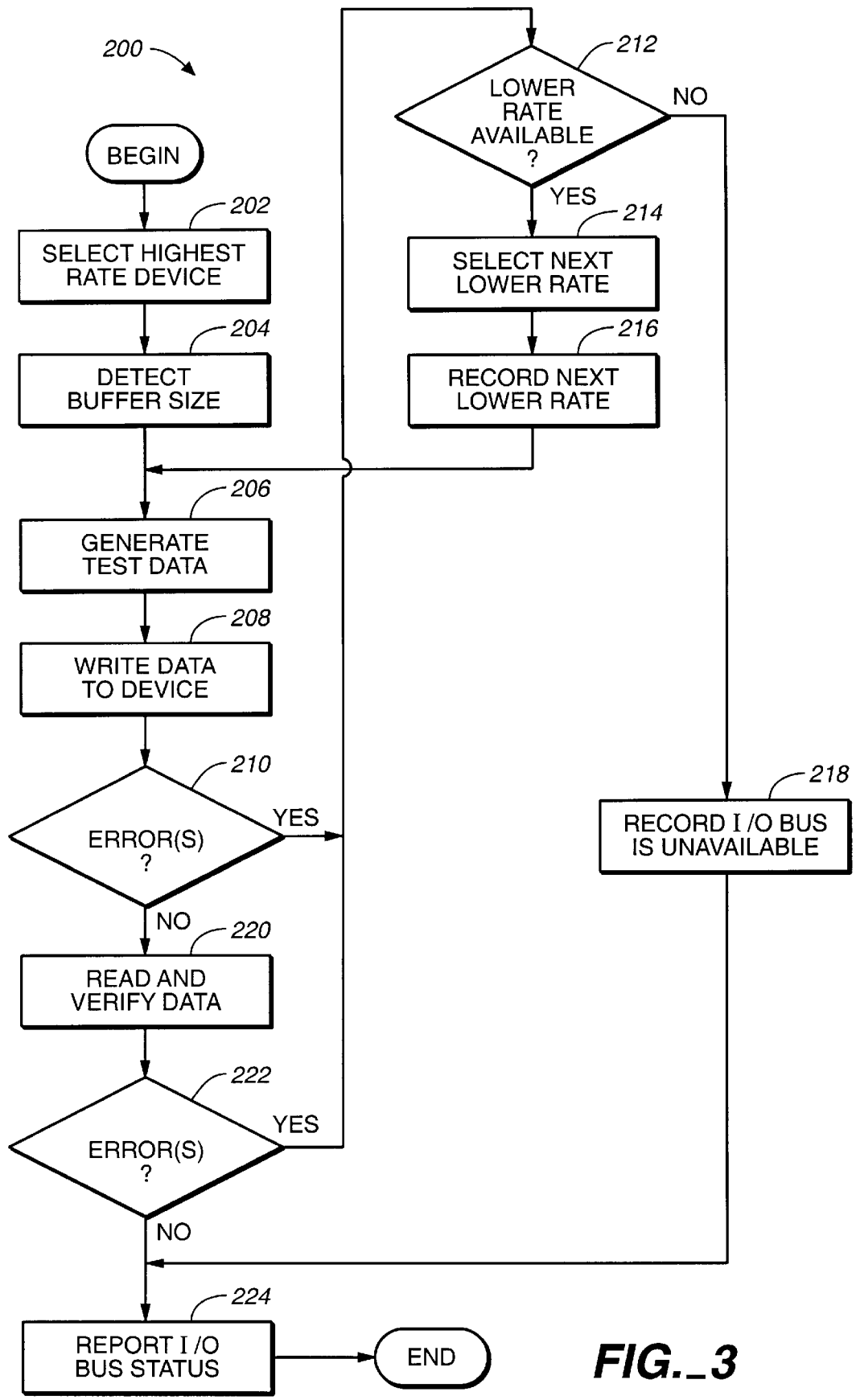
FIG. 3 shows a flowchart of a quick test method for testing the data transfer integrity of the peripheral bus of FIG. 1.

In FIG. 3, there is shown a flowchart of a quick test method 200 for testing the data transfer integrity of the peripheral bus 24. The purpose of the quick test method 200 is to quickly determine the reliability and efficiency of the data transfers across the peripheral bus 24. The quick test method 200 makes this determination by testing a single peripheral device which is coupled to the peripheral bus 24 and which supports a transfer rate as high or higher (as fast or faster) than the transfer rates supported by all other peripheral devices coupled to the peripheral bus 24. The quick test method 200 does not ensure that all peripheral devices coupled to the peripheral bus 24 will operate at the tested data transfer rate but instead decreases the probability of data transfer related errors. Furthermore, the quick test method 200 is preferably executed at system power-up and is also preferably hard-coded into a read only memory (ROM) of the device interface 14 or the computer system 10.

The quick test method 200 begins in step 202 with the computer system 10 selecting, for a test peripheral device, the peripheral device 18 or 20 that supports a transfer rate that is as high or higher (as fast or fastest) than the transfer rates supported by all other peripheral devices 18 or 20 that are coupled to the peripheral bus 24. After making this selection, the computer system 10 in step 204 determines the amount of buffer memory that the selected test peripheral device contains. The computer system 10, then generates in step 206 test data that is either (a) small enough, or (b) structured into multiple transfers that are small enough to be stored within the buffer memory of the test peripheral device. It should be appreciated that by limiting the size or structure of the test data to the buffer memory, the quick test method 200 may be executed upon mass storage devices without destroying or altering the data stored on the mass storage medium. Furthermore, the computer system 10 generates the test data such that it includes patterns which are likely to generate a lot of noise upon both portions of the peripheral bus 24 and are therefore likely to generate errors during transfers across the peripheral bus 24.

After generating the test data, the computer system 10 in step 208 writes the test data to the buffer memory of the test peripheral device by transferring the test data across the peripheral bus 24 to the test peripheral device at a test rate. Initially, the test rate in the preferred embodiment is selected to be the fastest transfer rate supported by the test peripheral device, and on subsequent iterations, the new test rate is selected to be a lower (slower) transfer rate than the test rate of the previous iteration.

Then, in step 210, the computer system 10 determines whether an error occurred (e.g. data was corrupted) as a result of the writing step 208 transferring the test data across the peripheral bus 24. If the computer system 10 determines in step 210 that an error occurred, then an error signal is generated which causes the computer system 10 to determine in step 212 whether the test peripheral device supports a lower transfer rate than the current test rate. If the peripheral device supports a lower transfer rate, then the next lower transfer rate is chosen (step 214) for the new test rate and the chosen lower transfer rate is recorded (step 216). Furthermore, after selecting the new test rate, the computer system 10 returns to step 206 in order to test the test peripheral device at this newly selected test rate. However, if the peripheral device does not support a lower transfer rate, then an error signal is generated which causes the computer system 10 to disable all transfers across the peripheral bus 24 and to record (step 218) that the peripheral bus 24 is unavailable due to no reliable transfer rate being found.

If, in step 210, the computer system 10 determines that an error did not occur in transferring the test data to the test peripheral device, then the computer system 10 in step 220 verifies the determination of step 210. The computer system 10 in step 220 reads the test data from the buffer memory of the test peripheral device and generates an error signal if the data read in step 220 does not match the data written in step 208. In step 222, the computer system 10 determines whether an error signal was generated in step 220. If the error signal was generated in step 220, the computer system 10 proceeds to step 212 where the computer system 10 determines whether the test peripheral device supports a lower transfer rate. However, if the error signal was not generated in step 220, then the peripheral bus 24 is most likely configured properly for reliable transfers at the tested rate and the computer system 10 proceeds to step 224.

In step 224, the computer system 10 generates a report indicating the highest reliable transfer rate that was tested and which transfer rates were found unreliable. The reported information may be used by a user to correct problems with the peripheral bus 24 configuration. Furthermore, the computer system 10 may utilize the information to ensure that all data transfers to peripheral devices coupled to the peripheral bus 24 occur at transfer rates at or below the found highest reliable transfer rate.

A bus width testing method 300 is shown in FIG. 4. The bus width testing method 300 is preferably implemented as a separate diagnostic program which the user can cause the computer system 10 to execute when the user wishes to test the data integrity of portions of the peripheral bus 24. Furthermore, in order to simplify the description of method 300, the peripheral devices 18 and 20 are assumed to be wide SCSI devices and the peripheral bus 24 of the computer system 10 is assumed to be a wide SCSI bus having a first group of bus lines 26 for transferring a lower byte of 16 bit data and a second group of bus lines 28 for transferring an upper byte of 16 bit data.

The method 300 begins in step 302 with the computer system 10 selecting, for a test peripheral device, a wide peripheral device that supports a transfer rate that is as high or higher (as fast or fastest) than the transfer rates supported by all other wide peripheral devices that are coupled to the peripheral bus 24. After making this selection, the computer system 10 sets a transfer width flag to a wide state and in step 304 determines the amount of buffer memory that the selected test peripheral device contains. The computer system 10, then generates in step 306 test data that is either (a) small enough, or (b) structured into multiple transfers that are small enough to be stored within the buffer memory of the test peripheral device. It should be appreciated that by limiting the size or structure of the test data to the buffer memory, the bus width testing method 300 may be executed upon mass storage devices without destroying or altering the data stored on the mass storage medium. Furthermore, the computer system 10 generates the test data such that it includes patterns which are likely to generate a lot of noise upon both portions of the peripheral bus 24 and are therefore likely to generate errors during transfers across the peripheral bus 24.

After generating the test data, the computer system 10 in step 308 writes the test data to the buffer memory of the test peripheral device by transferring the test data across the peripheral bus 24 to the test peripheral device at a test rate. In particular, if the transfer width flag is set to a narrow state (see step 320), then the computer system 10 transfers the test data across the first group of bus lines 26 and prevents data from being transferred across the second group of bus lines 28. However, if the transfer width flag is set to the wide state (see step 320) the computer system 10 transfers the test data in parallel byte pairs with a lower byte of the pair being transferred across the first group of bus lines 26 and an upper byte of the pair being transferred across the second group of bus lines 28. Furthermore, the test rate in the preferred embodiment is initially selected to be the highest (fastest) transfer rate supported by the test peripheral device, and on subsequent iterations, the new test rate is selected to be a lower (slower) transfer rate than the test rate of the previous iteration.

Then, in step 310, the computer system 10 determines whether an error occurred (e.g. data was corrupted) as a result of the writing step 308 transferring the test data across the peripheral bus 24. If the computer system 10 determines in step 310 that an error occurred, then an error signal is generated which causes the computer system 10 to determine in step 312 whether the transfer width flag is not set to the narrow state. If the computer system 10 determines that the transfer width flag is not set to the narrow state, the computer system 10 records that wide transfers at the test rate are unreliable (step 314) and sets the transfer width flag to the narrow state (step 316). After setting the transfer width flag to the narrow state, the computer system 10 returns to step 306 in order to determine whether the peripheral bus 24 supports reliable narrow transfers to the test peripheral device at the current transfer rate.

If the computer system 10 determines in step 312 that the transfer width flag is set to the narrow state, then the computer system 10 proceeds to step 318 where the computer system 10 determines whether the test peripheral device supports a lower transfer rate than the current test rate. If the peripheral device supports a lower transfer rate, then the next lower transfer rate is chosen for the new test rate, a record is made to indicate that narrow transfers at the tested rate are unreliable (step 320), and the transfer width flag is set to the wide state (step 322). After setting the transfer width flag to the wide state, the computer system 10 returns to step 306 in order to determine whether the peripheral bus 24 supports reliable wide transfers to the test peripheral device at the current transfer rate. If, however, the computer system 10 in step 318 determines that the test peripheral device does not support a lower transfer rate, then an error signal is generated which causes the computer system 10 to disable all transfers across the peripheral bus 24 and to record (step 324) that the peripheral bus 24 is unavailable due to no reliable transfer rate being found.

If, in step 310, the computer system 10 determines that an error did not occur in transferring the test data to the test peripheral device, then the computer system 10 in step 326 verifies the determination of step 310. The computer system 10 in step 326 reads the test data from the buffer memory of the test peripheral device and generates an error signal if the data read in step 326 does not match the data written in step 308. In step 328, the computer system 10 determines whether an error signal was generated in step 326. If an error signal was generated in step 326, the computer system 10 proceeds to step 312 where the computer system 10 determines whether the transfer width flag is set to the narrow state. However, if the error signal was not generated in step 328, then the peripheral bus 24 is most likely configured properly for reliable transfers at the tested rate and the computer system 10 proceeds to step 330.

In step 330, the computer system 10 generates a report indicating (a) the highest reliable transfer rate and bus width that was tested, (b) which transfer rates and bus widths were found unreliable, and (c) whether the peripheral bus 24 is unavailable due to no reliable transfer rate being found. The reported information may be used by a user to correct problems with the peripheral bus 24 configuration. Furthermore, the computer system 10 may utilize the information to ensure that all data transfers to peripheral devices coupled to the peripheral bus 24 occur at transfer rates and bus widths which are at or below the highest found reliable transfer rate and bus width.

It should be appreciated that problems with the bus lines 28 which transfer the upper bytes of wide SCSI data are somewhat common. Therefore, a method of testing this portion of a wide SCSI bus could be quite helpful in detecting and correcting an improperly configured wide SCSI bus.

Now referring to FIG. 5, there is shown a flowchart of a threshold method 400 for detecting data integrity problems upon the peripheral bus 24 during normal operation. The threshold method 400 is preferably implemented within the device driver software the processor 12 executes to transfer data to and from the peripheral devices 18 and 20. The method 400 in essence monitors data transfer errors upon the peripheral bus 24 and generates an error signal which informs a user of the computer system 10 that there may be a problem with the peripheral bus 24.

In particular, every time data is transferred to a peripheral device 18 or 20 via the peripheral bus 24, the computer system 10 determines whether an error occurred during the data transfer (steps 402 and 404). If an error did not occur during the transfer of step 402, then the computer system 10 proceeds with normal operation. However, if the computer system 10 determines in step 404 that an error occurred during the data transfer of step 402, then an error signal is generated which causes the computer system 10 in step 406 to determine whether an error counter, that counts the number of error signals or data errors that have been generated, should be reset. The error counter may be implemented so that the counter is reset for various reasons such as the error counter has not exceeded a threshold value within a predetermined time interval or within a predetermined number of data transfers. If the computer system 10 determines in step 406 that the error counter should be reset, then the error counter is reset in step 408 and updated in step 410. However, if the computer system 10 determines that the error counter should not be reset, then the error counter is updated in step 410 without being reset.

The computer system 10, then in step 414, determines whether the error counter has reached or exceeded some predetermined threshold. This predetermined threshold is set to a level which if exceeded by the error counter indicates that the peripheral bus 24 is probably configured improperly. If the computer system 10 determines in step 412 that the counter has exceeded the predetermined threshold, then an error signal is generated which causes the computer system 10 to disable further transfers across the peripheral bus 24 and to report that the peripheral bus is probably configured improperly. However, if the computer system 10 determines that the counter has not exceed the predetermined threshold, then the computer system 10 proceeds with normal operation.

It should be appreciated that the above threshold method 400 is especially useful with peripheral buses that have relatively low integrity (i.e. transfer errors are common) but which use strong error detection and/or error correction techniques. Furthermore, it should be appreciated that multiple error counters could be used in the above method to count different types of data transfer errors and that each counter could have its own programmable threshold level.

It should also be appreciated by those skilled in the art that the above described methods may be implemented in various manners and that various features of the above methods may be mixed and matched. Furthermore, one skilled in the art should appreciate that the above methods and various features of the above methods may be incorporated (1) in device driver software which the processor 12 executes in order to communicate with the peripheral devices 18 and 20; (2) in diagnostic software which a user may cause to be executed from the memory 14; or (3) in an initialization routine stored in a read only memory (ROM).

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

What is claimed is:

1. In a computer system having a peripheral bus and a peripheral device coupled together, a method of testing the peripheral bus for data transfer integrity, comprising the steps of:

transferring first data to the peripheral device via the peripheral bus;

generating a first error signal if the first data was corrupted during the first data transferring step;

updating a counter in response to generation of the first error signal; and generating a second error signal if the counter exceeds a predetermined threshold.

2. The method of claim 1, further comprising the step of generating parity information from the first data, wherein:

the first data transferring step includes the step of transferring the parity information to the peripheral device via the peripheral bus, and the first error signal generating step includes the steps of (1) after the first data transferring step, calculating a parity value from the first data and the parity information, and (2) generating the first error signal if the parity value is not equal to a predetermined value.

3. The method of claim 1, further comprising the steps of generating a first checksum value from the first data, wherein:

the first error signal generating step includes the steps of (1) after the first data transferring step, calculating a second checksum value from the first data, and (2) generating the first error signal if the second checksum value is not equal to the first checksum value.

4. The method of claim 1, further comprising the steps of (1) encoding the first data prior to the first data transferring step, and (2) decoding the first data after the first data transferring step, wherein:

the first error signal generating step includes the step of generating the first error signal if the decoding step indicates that the first data was corrupted during the first data transferring step.

5. The method of claim 1, wherein the first data transferring step includes the step of transferring the first data at a first transfer rate, further comprising the step of:

in response to generation of the second error signal, transferring second data to the peripheral device at a second transfer rate that is slower than the first transfer rate.

6. The method claim 1, further comprising the step of:

resetting the counter if the counter has not exceeded the predetermined threshold within a predetermined time period.

7. The method of claim 1, further comprising the step of:

resetting the counter if the counter has not exceeded the predetermined threshold within a predetermined number of data transfers.

8. The method of claim 1, wherein (1) the first data transferring step includes the steps of (a) transferring a first portion of the first data across a first plurality of lines of the peripheral bus, and (b) transferring a second portion of the first data across a second plurality of lines of the peripheral bus, and (2) the generating step includes the step of generating the first error signal if the first data was corrupted during the second portion transferring step, further comprising the step of:

in response to generation of the second error signal, (1) transferring second data across the first plurality of lines, and (2) preventing the second data from being transferred across the second plurality of lines.

9. The method of claim 1, further comprising the steps of (1) selecting a second peripheral device that is coupled to the peripheral bus, and (2) transferring second data to the second peripheral device, wherein:

the first error signal generating step includes the step of generating the first error signal if the second data was corrupted during the second data transferring step.

10. The method of claim 1, wherein:

the peripheral device supports up to a first transfer rate, a second peripheral device that is coupled to the peripheral bus supports up to a second transfer rate that is slower than the first transfer rate, and the first data transferring step includes the step of transferring the first data to the peripheral device at the first transfer rate.

11. The method of claim 1, wherein:

the peripheral bus is a SCSI bus, and the first data transferring step includes the step of transferring the first data to the peripheral device via the SCSI bus.

12. In a computer system having a peripheral bus and a peripheral device coupled together, a method of testing the peripheral bus for data transfer integrity, comprising the steps of:

transferring first data in a first manner to the peripheral device via the peripheral bus;

encoding the first data prior to the first data transferring step;

decoding the first data after the first data transferring step;

generating a first error signal if the first data was corrupted during the first data transferring step; and in response to generation of the first error signal, transferring second data to the peripheral device in a second manner that is different than the first manner, wherein:

the first error signal generating step includes the step of generating the first error signal if the decoding step indicates that the first data was corrupted during the first data transferring step.

13. In a computer system having a peripheral bus and a peripheral device coupled together, a method of testing the peripheral bus for data transfer integrity, comprising the steps of:

transferring first data in a first manner to the peripheral device via the peripheral bus;

generating a first error signal if the first data was corrupted during the first data transferring step; and in response to generation of the first error signal, transferring second data to the peripheral device in a second manner that is different than the first manner, wherein:

the first data transferring step includes the step of transferring the first data at a first transfer rate, and in response to generation of the first error signal, the second data transferring step includes the step of transferring the second data at a second transfer rate that is slower than the first transfer rate.

14. In a computer system having a peripheral bus and a peripheral device coupled together, a method of testing the peripheral bus for data transfer integrity, comprising the steps of:

transferring first data in a first manner to the peripheral device via the peripheral bus, the first data transferring step including the steps of (a) transferring a first portion of the first data across a first plurality of lines of the peripheral bus, and (b) transferring a second portion of the first data across a second plurality of lines of the peripheral bus;

generating a first error signal if the first data was corrupted during the first data transferring step, the generating step including the step of generating the first error signal if the first data was corrupted during the second portion transferring step; and in response to generation of the first error signal, transferring second data to the peripheral device in a second manner that is different than the first manner, the second data transferring step including the steps of (1) transferring second data across the first plurality of lines, and (2) preventing the second data from being transferred across the second plurality of lines.

15. In a computer system having a peripheral bus and a peripheral device coupled together, a method of testing the peripheral bus for data transfer integrity, comprising the steps of:

transferring first data in a first manner to the peripheral device via the peripheral bus;

generating a first error signal if the first data was corrupted during the first data transferring step; and in response to generation of the first error signal, transferring second data to the peripheral device in a second manner that is different than the first manner, wherein:

the peripheral device supports up to a first transfer rate, a second peripheral device that is coupled to the peripheral bus supports up to a second transfer rate that is slower than the first transfer rate, and the first data transferring step includes the step of transferring the first data to the peripheral device at the first transfer rate.

16. A computer system, comprising:

a processor;

a memory;

a SCSI interface;

a system bus that operatively couples said processor to said memory and to said SCSI interface;

a SCSI device; and a SCSI bus that operatively couples said SCSI device to said SCSI interface;

wherein said memory includes a first plurality of instructions that when executed by said processor causes first data to be transferred to said SCSI device in a first manner, wherein said SCSI device generates an error signal upon said SCSI bus if said SCSI device determines that said first data, after being received from said SCSI bus, is corrupted, and wherein said memory includes a second plurality of instructions that when executed by said processor in response to generation of said error signal, causes second data to be transferred to said SCSI device in a second manner.

17. The computer system of claim 16, wherein:

said SCSI bus includes a first plurality of bus lines and a second plurality of bus lines, said first plurality of instructions when executed by said processor causes a first portion of said first data to be transferred across said first plurality of bus lines and a second portion of said first data to be transferred across said second plurality of bus lines, said SCSI device generates said error signal if said second portion of said first data received via said second plurality of bus lines is corrupted, and said second plurality of instructions when executed by said processor in response to generation of said error signal (1) causes said second data to be transferred across said first plurality of bus lines, and (2) prevents said second data from being transferred across said second plurality of bus lines.

18. The computer system of claim 16, wherein:

said first plurality of instructions when executed by said processor causes said first data to be transferred to said SCSI device at a first transfer rate, and said second plurality of instructions when executed by said processor in response to generation of said error signal causes said second data to be transferred to said SCSI device at a second transfer rate that is slower than said first transfer rate.

* * * * *